United States Patent

Goeddel

[15] 3,650,896
[45] Mar. 21, 1972

[54] NUCLEAR FUEL PARTICLES

[72] Inventor: Walter V. Goeddel, Poway, Calif.

[73] Assignee: The United States of America as represented by the United States Atomic Energy Commission

[22] Filed: Oct. 9, 1969

[21] Appl. No.: 865,017

[52] U.S. Cl. .................................... 176/68, 176/91 SP
[51] Int. Cl. ............................................. G21c 3/06
[58] Field of Search .................. 176/67, 68, 91, 91 SP

[56] References Cited

UNITED STATES PATENTS

| | | | |
|---|---|---|---|
| 3,166,614 | 1/1965 | Taylor | 176/91 X |
| 3,179,723 | 4/1965 | Goeddel | 176/68 X |
| 3,212,989 | 10/1965 | Fitzer et al. | 176/71 |
| 3,249,509 | 5/1966 | Blocher et al. | 176/67 |
| 3,290,223 | 12/1966 | Blocher et al. | 176/67 |
| 3,298,921 | 1/1967 | Bokros et al. | 176/67 |
| 3,312,597 | 4/1967 | Glueckauf | 176/67 |
| 3,325,363 | 6/1967 | Goeddel | 176/67 |
| 3,335,063 | 8/1967 | Goeddel | 176/91 X |
| 3,361,638 | 1/1968 | Bokros et al. | 176/67 |

*Primary Examiner*—Benjamin R. Padgett
*Assistant Examiner*—Gary G. Solyst
*Attorney*—Roland A. Anderson

[57] ABSTRACT

Nuclear fuel particles having fissile or fertile central cores surrounded by a buffer layer of low density pyrolytic carbon. A shell of dense silicon carbide, zirconium carbide or niobium carbide surrounds the buffer layer, and a layer of isotropic pyrolytic carbon may be disposed therebetween. To maintain the dense carbide shell in compression during the fuel particle lifetime, an outer isotropic carbon shell is provided which shrinks down onto the carbide shell as a result of high temperature, fast neutron irradiation. To prevent stresses of too great a magnitude from being created early in the fuel particle lifetimes, an intermediate layer of compressible pyrolytic carbon is disposed immediately exterior of the carbide shell. Nuclear reactors utilizing such particles can be operated at temperatures about 800° C. to a fast neutron dosage over $4 \times 10^{21}$ neutrons/cm.$^2$ while maintaining good fission product retentivity within the coated fuel particles.

8 Claims, 3 Drawing Figures

INVENTOR
WALTER V. GOEDDEL

ATTY

NUCLEAR FUEL PARTICLES

This invention relates to fuel particles for nuclear reactors and, more particularly, to fuel particles having coatings of pyrolytic carbon and silicon carbide and to methods for operating nuclear reactors for prolonged periods using such particles under conditions of high temperature and high level fast neutron irradiation.

It is well known that pyrolytic carbon coatings are useful in protecting particles of nuclear fuel, i.e., fissile and/or fertile materials, such as uranium, plutonium and thorium and suitable compounds thereof. There are advantages to be gained if fuel particles coatings have sufficient impermeability to retain gaseous and metallic fission products within the confines thereof. To meet this objective throughout the life of the nuclear fuel particles, the coatings should maintain their structural integrity although exposed to high temperatures and irradiation over prolonged periods of reactor operation. Examples of fuel particles employing pyrolytic carbon coatings are disclosed and described in U.S. Pat. No. 3,335,063, issued Aug. 8, 1967, in the names of Walter V. Goeddel, Charles S. Luby and Jack Chin; U.S. Pat. No. 3,298,921, issued Jan. 17, 1968 in the names of Jack C. Bokros, Walter V. Goeddel, Jack Chin and Robert J. Price; and U.S Pat. No. 3,361,638, issued Jan. 2, 1968, in the names of Jack C. Bokros and Alan S. Schwarz. Although these fuel particles are well suited for many nuclear energy applications, nuclear fuel particles having still better fission product retention characteristics are always desired.

It is an object of the present invention to provide improved coated fuel particles which include a dense carbide layer. A further object is to provide coated nuclear fuel particles which will exhibit excellent fission product retention, although subjected to high temperatures and a high level of fast neutron irradiation for a prolonged period of time. Still another object is to provide a method for operating a nuclear reactor at high temperatures under conditions of fast neutron irradiation wherein the fuel is employed for a relatively long lifetime.

These and other objects of the invention should be apparent from the following detailed description when read in conjunction with the accompanying drawings wherein.

The integrity of a dense carbide shell in a nuclear fuel particle coating can be substantially enhanced if the shell is maintained in compression. An outer isotropic pyrolytic carbon shell is considered well-suited for applying a compressive stress to the silicon carbide shell because such a pyrolytic carbon can be deposited with crystalline characteristics that will cause it to shrink at a desired rate onto the underlying silicon carbide shell under exposure to high temperatures and high level neutron irradiation. Isotropic pyrolytic carbon in the density range of 1.5 to about 1.7 grams per cm.$^3$ exhibits a desirable rate of shrinkage during later stages of irradiation where it is quite important to counterbalance the interior pressure that gradually accumulates within the carbide shell from the creation of gaseous fission products. However, such isotropic pyrolytic carbon shrinks at a fairly high rate during the early stages of irradiation, and stresses might be created either in the underlying silicon carbide layer or in the pyrolytic carbon layer itself during this period which might later adversely affect the integrity thereof.

It has been found that by providing an intermediate layer of compressible pyrolytic carbon between the outer surface of the dense carbide shell and the inner surface of the isotropic pyrolytic carbon shell that this problem during the early stages of irradiation is eliminated. It is found that such an intermediate pyrolytic carbon layer is compressed during the early stages of irradiation and becomes sufficiently compact to subsequently transmit the compressive force from the shrinking isotropic carbon shell inward to the dense carbide shell prior to the time that the gas pressure within the dense carbide shell reaches a substantial magnitude.

Figure 1:
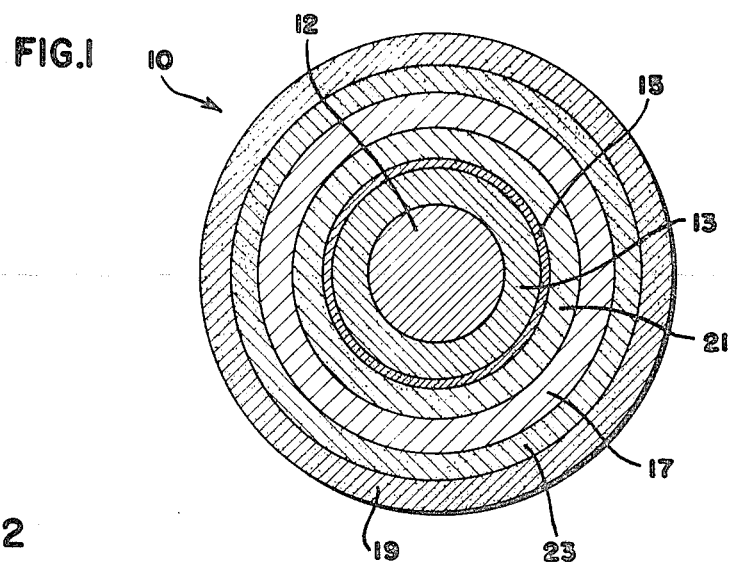
FIG. 1 is a cross-sectional view of a nuclear fuel particle embodying various features of the invention.

Shown in FIG. 1 is a fuel particle 10 embodying various features of the invention. The fuel particle 10 includes a central core 12 of fissile or fertile material which may have any suitable shape. However, for particles of this type the core is usually not greater than a millimeter in size. Nuclear fuel in the form of spheriods between about 100 microns and 500 microns in diameter are preferred for many applications, although larger and smaller spheriods may be used. The core materials may be in carbide form or in other suitable forms, such as the oxide, nitride or silicide, which are stable at relatively high temperatures. The term "nuclear fuel" is used in its usual sense to include the fissionable or fertile isotopes of uranium, thorium and plutonium.

Nuclear fuel materials have a tendency to expand during high temperature operations, and upon fissioning gaseous and metallic fission products are created Accommodation of these effects is important in providing a fuel particle suitable for prolonged operation under conditions of high neutron flux; and particularly if a dense nuclear fuel core 12 is employed, a layer 13 of low density buffer material is desirably disposed near the outer surface of the core. The buffer material should, of course, be compatible with the core material both in the environment in which it is initially deposited and in the environment where in the fuel particle 10 is employed. It has been found that low density (not greater than about 60 percent of theoretical maximum density) pyrolytic carbon is preferable for use with nuclear fuels.

Spongy pyrolytic carbon is preferred as a buffer material and is defined as soot-like amorphous carbon having a diffused X-ray diffraction pattern and a density of about 1.3 grams per cm.$^3$ or below. Spongy carbon is considered to excellently attenuate fision recoils, and it thereby prevents structural damage to outer layers of the fuel particle 10 which will provide the fission-product retentive pressure vessel. To serve these various purposes, spongy carbon is usually employed at a thickness of at least about 20 microns and layers of up to about 100 microns might be employed. Generally, spongy carbon in the range of about 50 to 60 microns is used.

It may be desirable in fuel particle production operations to provide a thin seal layer 15 immediately exterior of the buffer layer 13, particularly when oxide core materials are used. The seal layer 15 is generally as thin as possible commensurate with the desired function of providing a gas barrier during the remainder of the production steps wherein the outer layers which form the pressuretight jacket are deposited. Dense laminar or isotropic pyrolytic carbon is considered suitable for the seal layer 15, and dense laminar carbon is preferred. Generally, laminar carbon having a density of at least about 1.7 grams per cm.$^3$ will provide a sufficient gas barrier at a thickness as low as 1 micron. Because it is often difficult to determine whether extremely small particles, such as those having diameters between 100 and 500 microns, are uniformly coated, a seal layer 15 between about 2 to 5 microns is usually preferred when oxide core materials are used. The spongy carbon buffer layer 13 is somewhat fragile, and the seal layer 15 also provides some mechanical protection to the buffer layer 13 which facilitates handling for the inspection purposes or for transfer to another coating apparatus for deposition of the outer layers. To take full advantage of this feature, the seal layer 15 is deposited in the same coating apparatus wherein the buffer layer 13 is applied.

Although various high temperature-stable metal or metalloid carbides can be used for a shell 17 to provide the desired fission-product retention, from a standpoint of neutron economy it is likely that silicon, niobium or zirconium carbide, or a mixture thereof, would be employed because of their relatively low neutron capture cross sections. Silicon carbide is commonly employed because it is relatively inexpensive and because there is presently available a fairly large accumulation of data on the pyrolysis of methyltricholorsilane in the presence of an excess of hydrogen gas, one of the reactions commonly employed to deposit silicon carbide from the vapor phase. The seal layer 15 or an inner layer 21 of isotropic pyrolytic carbon, described hereinafter, provides a gaseous barrier which eliminates any potential reaction between hydrogen chloride gas (a byproduct of the aforedescribed pyrolysis reaction) with uranium that may be present in the central core 12. Generally, the carbide shell 17 is employed at a thickness between about 20 and 30 microns to provide the desired assistance in the containment of fission products and to provide a structural body having sufficient strength to maintain its integrity both during handling for subsequent coating operations and thereafter during its lifetime in a nuclear reactor. Although silicon carbide shells of greater or slightly lesser thickness can be employed, it seems unlikely from a standpoint of neutron economy that a layer greater than about 40 microns in thickness would be used. Generally, the carbide is employed in the thickness ranges above-enumerated having a density of at least about 90 percent of its theoretical maximum density.

In order to prevent fracture of the dense carbide shell 17 and consequent failure of the coated fuel particle 10 as a fission-product retentive pressure vessel, the structural stress within the carbide shell 17 should be maintained within a particular range throughout the life of the fuel particle. As previously indicated, an isotropic pyrolytic carbon shell 19 is disposed exterior of the carbide shell 17 having the crystalline characteristic that it undergoes controlled shrinkage under neutron irradiation. The shrinkage imposes a compressive force on the dense carbide shell 17 which counteracts the internal forces resulting from the buildup of gaseous fission products therewithin. This balance becomes more important as the lifetime of the fuel particle 10 within a nuclear reactor core increases and the internal pressure of gaseous fission products reaches higher and higher levels.

It may also be desirable to employ a dense isotropic pyrolytic carbon layer 21 interior of the silicon carbide layer 17 to prevent possible chemical reaction between the materials in the nuclear fuel core 12 and the silicon carbide as a result of thermally induced migration which might occur during the lifetime of the fuel particle 10. It may be possible for metal atoms from the core 12 to migrate outward through the buffer layer 13 under high neutron irradiation conditions. Such migration might result in uranium and fission products from the core chemically reacting with the silicon carbide. However, the provision of an adequate layer 21 of isotropic pyrolytic carbon interior of the carbide shell substantially eliminates such a potential interaction throughout the anticipated lifetime of the fuel particles 10.

To achieve the desired function, the isotropic carbon employed in the layer 21 should usually be between about 15 and 25 microns thick and have a density in the range of about 1.7 to 1.95 grams per cm.$^3$. The isotropy of carbon is conveniently measured in terms of its Bacon Anisotropy Factor (BAF). The technique of measurement and a complete explanation of the scale of measurement is set forth in an article by G. E. Bacon entitled "A Method for Determining the Degree of Orientation of Graphite" which appeared in the Journal of Applied Chemistry, Volume 6, page 477 (1956). Under the Bacon system of measurement, perfectly isotropic carbon has a BAF of 1.0. The pyrolytic carbon employed for the layer 21 should preferably have a BAF of about 1.2 or less.

The outer pyrolytic carbon shell 19 is preferably impermeable to gas and of such a character that it maintains the metal carbide shell 17 in a state of slight compression throughout continuing neutron irradiation in spite of the continuing pressure buildup therewithin. The exterior shell 19 thus structurally reinforces the silicon carbide and provides a secondary gas barrier while also protecting the carbide shell 17 from damage from without. However, as previously indicated, the characteristics of the outermost shell 19 are chosen so as to exert the desired compressive force on the interior carbide shell 17.

It has been found that isotropic pyrolytic carbon having a density between about 1.5 and about 1.7 grams per cm.$^3$ exhibits the desired controlled shrinkage in a direction parallel to the plane of deposition to maintain the state of compression desired in the carbide shell during the later stages of neutron irradiation. The isotropic carbon shell should also be at least about 20 microns thick, and it is likely that an isotropic carbon shell between about 20 and 40 microns thick would be used. Preferably, the isotropic pyrolytic carbon employed has a BAF of about 1.2 or less, and an average crystallite size of between about 35 and 150 A.

The layer 23 appearing intermediate the exterior surface of the carbide shell 17 and the interior surface of the outer pyrolytic carbon shell is the compressible pyrolytic carbon layer referred to earlier. The details of the compressible layer 23 are set forth hereinafter.

Figure 2:
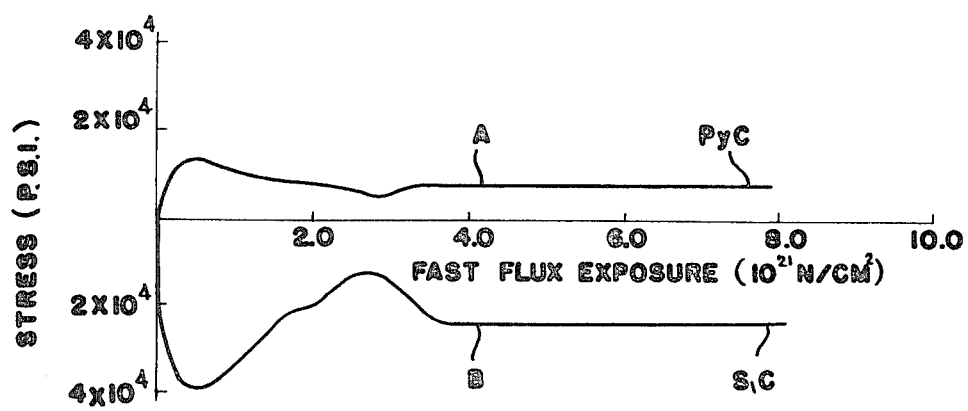
FIG. 2 is a graphical representation of the stress versus neutron dosage for various of the coating layers of a nuclear fuel particle deviating slightly from that shown in FIG. 1.

FIG. 2 is a graphical representation wherein stress, measured in p.s.i., is plotted against total neutron dosage, measured as N/cm.$^2$ and which is expressed as a multiple of neutron flux and time. For purposes of this application, neutron flux is measured as neutrons per square centimeter per second, using fast neutrons having an energy greater than about 0.18 Mev.

Figure 3:
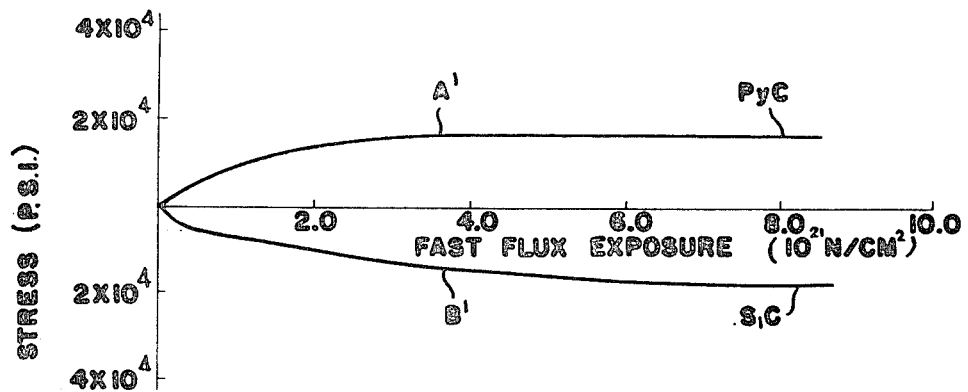
FIG. 3 is a graphical representation similar to that of FIG. 2 for the nuclear fuel particle illustrated in FIG. 1.

FIG. 2 is representative of a profile of the stress in the carbide shell 17 and in the exterior isotropic pyrolytic carbon shell 19 for fuel particles generally similar to the fuel particle 10 shown in FIG. 1 wherein no intermediate layer 23 is provided and the isotropic pyrolytic carbon shell 19 is deposited directly upon the silicon carbide shell 17. In FIGS. 2 and 3, the region above the abscissa indicates tensile stress whereas the area therebelow indicates compressive stress. The upper curve marked A in FIG. 2 is a plot of the tangential tensile stress at the inner surface of the isotropic pyrolytic carbon outer shell 19, and the lower curve marked B is a plot of the tangential compressive stress in the silicon carbide shell. As is apparent from the curves, during the initial stages of irradiation, i.e., up to a dosage of about $2 \times 10^{21}$ N/cm.$^2$ (E>0.18 Mev), shrinkage or densification in the pyrolytic carbon occurs at a fairly rapid rate causing the silicon carbide shell 17 to be placed under a fairly high compressive stress while a counteracting tensile stress of nearly similar magnitude is created in the isotropic pyrolytic carbon shell 19. As the neutron irradiation dosage continues to increase, it is seen that the tensile stress curve begins to decrease as a result of stress relaxation due to irradiation induced creep in the pyrolytic carbon and as a result of a reduced rate of shrinkage in the pyrolytic carbon.

After a level of about $2-3 \times 10^{21}$ N/cm.$^2$ is reached, it can be seen that the curve A substantially levels off. In this region of neutron dosage, the shrinkage experienced by the isotropic pyrolytic carbon shell 19 in a direction parallel to the plane of deposition is at a rate about equal to balance the stresses due to the rate of increase in fission product pressure interior of the silicon carbide shell 17 so that the net result is that the tensile stress within the isotropic carbon shell and the compressive stress in the carbide shell remain at about the same values.

The isotropic pyrolytic carbon shell 19 may not be able to withstand the rate of buildup of tensile stress which occurs during the early neutron irradiation as a result of the very rapid initial densification phenomena, and cracking on a microscale may occur which may ultimately result in the subsequent failure of the isotropic pyrolytic carbon shell. However, it has been found that if an intermediate pyrolytic carbon layer 23 is disposed between the carbide shell 17 and the exterior isotropic pyrolytic carbon shell 19, the stress curves for the isotropic pyrolytic carbon and the carbide shell straighten out to acceptable and desirable slopes. The intermediate pyrolytic carbon layer 23 is chosen with crystalline characteristics and a predetermined density and thickness so that it is compressed during the initial irradiation dosage period and thus provides space into which the isotropic pyrolytic carbon shell 19 can shrink while transferring very little inward force to the carbide shell 17. However, the characteristics of the intermediate layer 23 are chosen such that it has substantially completed its compression by the time that a neutron dosage equal to $2\text{-}3 \times 10^{21}$ N/cm$^2$(E>B0.18 Mev) is reached.

FIG. 3 is a graphical representation similar to that shown in FIG. 2 in which curve A' represents the tensile stress in the isotropic pyrolytic carbon shell 19 in a fuel particle 10 wherein such an intermediate layer 23 of compressible pyrolytic carbon is employed. B' is a curve indicating the compressive stress created in the carbide shell 17. As can be seen, both the tensile stress in the exterior isotropic pyrolytic carbon shell 19 and the compressive stress in the silicon carbide shell 17 develop at substantially even rate. In order to provide the desired amount of compressibility, it has been found that the intermediate layer 23 should have a density of between about 0.7 and about 1.2 grams per cm.$^3$. The thickness of the intermediate pyrolytic carbon layer employed varies between 10 and 30 microns. Generally, when carbon having a density of about 1.2 grams per cm.$^3$ (near the upper end of the density range) is used, a thickness of near 30 microns is employed. Oppositely, when carbon having a density near the lower end of the density range, i.e., about 0.7 grams per cm.$^3$, is used, the thickness generally employed will be closer to 10 microns.

The pyrolytic carbon employed for the intermediate layer 23 should be similar in structure to the spongy buffer layer 13. Regardless of the precise crystalline structure of the pyrolytic carbon employed, carbon within this density range should exhibit the desired compressibility during the initial neutron irradiation period, thus delaying any significant transfer of force to the interior carbide shell 17. Preferably, the intermediate layer is made of spongy pyrolytic carbon having an average crystallite size (Lc) below about 50 A. for good performance throughout the density range.

High temperature gas-cooled nuclear reactors, such as the HTGR reactor now operating at Peach Bottom, Pennsylvania, can be efficiently operated over relatively long fuel lifetimes using particles made in accordance with the foregoing principles. Such coated fuel particles are designed to exhibit excellent fission retentivity although exposed to temperatures between about 800° and 1350°C. for neutron dosages up to as high as $8\text{-}9 \times 10^{21}$ N/cm.$^2$ (E>0.18 Mev.) within the core of such a nuclear reactor.

The following example illustrates a process for producing the coated nuclear fuel particles having various features of the invention. It should be understood of course that this example is only illustrative and does not constitute limitations upon the scope of the invention.

EXAMPLE

Particulate thorium-uranium dicarbide is prepared having a particle size of about 200 microns and being generally spheroidal in shape. The material used has a thorium to uranium mole ratio of about 3 to 1. A graphite reaction tube having an internal diameter of about 2.5 inches is heated to about 1,100° C. while a flow of helium is maintained therethrough. When the coating is ready to begin, a charge of 100 grams of the cores of thorium-uranium dicarbide is fed into the top of the reaction tube while the flow of helium upward through the tube is maintained at a rate sufficient to levitate the cores and create within the tube a fluidized particle bed.

When the temperature of the cores reaches about 1,100°C., acetylene gas is admixed with helium to provide an upwardly flowing gas stream having a total flow rate about 10,000 cm.$^3$/min. and a partial pressure of acetylene of about 0.8 (total pressure of 1 atmosphere). The acetylene decomposes and deposits low density, spongy carbon upon the cores. Flow of the acetylene is continued for a sufficient time to deposit upon each of the cores a layer of about 50 microns thick of spongy pyrolytic carbon having a density of about 1.0 gram/cm.$^3$.

The flow of acetylene then terminated, and the temperature is raised to about 2,000° C. When this temperature is reached a gas flow of about 2,000 cm.$^3$/min. of methane and 8,000 cm.$^3$/min. of helium is employed. After about 20 minutes, the methane flow is terminated. By this time, a layer approximately 20 microns thick of isotropic pyrolytic carbon having a density of about 1.9 grams/cm.$^3$ and a BAF of about 1.05 is deposited on each of the particles.

The temperature is then lowered to about 1,500° C. Hydrogen is employed as the fluidizing gas at a rate of about 10,000 cm.$^3$/min., and about 10 percent of the hydrogen stream is bubbled through a bath of methyltrichlorosilate at room temperature. These conditions are maintained for about 1 hour, by the end of which time silicon carbide is uniformly deposited on each of the carbon-coated spheroids in the form of a layer about 20 microns thick. Subsequent examination and measurement shows that the silicon carbide is beta phase silicon carbide having a density of about 3.19 grams/cm.$^3$, which is about 99 percent of the theoretical density of silicon carbide (3.215 g./cm.$^3$).

The silicon-carbide coated cores are maintained in fluidized condition, substituting helium as the fluidizing gas, and the temperature is adjusted to about 1,000°C. At this temperature the flow of gas is altered to provide a mixture of acetylene at 9,000 cm.$^3$/min. and helium at 1,000 cm.$^3$/min. Coating is carried on for about 3 minutes, during which time a layer about 20 microns thick of spongy pyrolytic carbon is deposited upon each of the silicon carbide-coated spheroids. The carbon has a density of about 1.1 grams/cm.$^3$ and an average crystallite size of about 20° A.

The temperature is raised to about 1,400° C., and the flow of gas is altered to provide a mixture of propane at 4,000 cm.$^3$/min., and helium at 6,000 cm.$^3$/min. Coating is carried on for about 5 minutes, during which time a layer of about 50 microns thick of isotropic carbon is deposited on each of the coated spheroids. The coated spheroids are slowly cooled at room temperature and examined. The isotropic carbon has a density of about 1.9 grams/cm.$^3$ and a BAF of about 1.04.

Testing of the coated particles is carried out by disposing them in a suitable capsule and subjecting them to neutron irradiation at an average temperature of about 1,325° C. During the time of irradiation, the total fast neutron dose is estimated to be about $8 \times 10^{21}$ neutrons/cm.$^2$ using neutrons of energy greater than about 0.18 Mev. During this period, burnup of over 20 percent of the metal atoms in the nuclear fuel cores occurs. No coating failures are apparent, and the dimensional stability of the coatings is considered completely satisfactory. The fission-product retention of the particles is well within acceptable limits, and these particles are considered to be well suited for use in a high temperature gas-cooled power reactor.

The foregoing process is repeated except that the intermediate layer of pyrolytic carbon is omitted and the 50 micron thick outer layer of isotropic pyrolytic carbon is deposited directly upon the silicon-carbide shell. Testing of these particles is carried out in the same manner as described above to an irradiation dosage of $4 \times 10^{21}$ neutrons/cm$^2$ (E>0.18 Mev.) Examination of the particles shows a significant number of coating failures, and it is considered that these coating failures result from the creation of stresses in the isotropic pyrolytic carbon shell during the initial irradiation when densification occurs at a fairly rapid rate within the isotropic pyrolytic carbon shell.

Various features of the invention are set forth in the claims that follow.

What is claimed is:

1. A nuclear fuel particle comprising a central core of fissile or fertile material, a layer of low density buffer material surrounding said core, a dense carbide shell exterior of said buffer layer made of a material selected from the group consisting of silicon carbide, zirconium carbide, niobium carbide and mixtures thereof, a shell of isotropic pyrolytic carbon having a density of between about 1.5 g./cm.$^3$ and about 1.7 g./cm.$^3$ exterior of said carbide shell, and an intermediate layer of spongy pyrolytic carbon disposed between and in contact with said carbide shell and said isotropic pyrolytic carbon shell and having a density between about 0.7 and about 1.2 g./cm.$^3$.

2. A nuclear fuel particle in accordance with claim 1 wherein said intermediate layer is between about 10 and about 30 microns thick.

3. A nuclear fuel particle in accordance with claim 2 wherein said carbide shell is made of silicon carbide having a density between about 3.17 and about 3.20 g./cm.³.

4. A nuclear fuel particle in accordance with claim 1 wherein said carbide shell is at least about 20 microns thick.

5. A nuclear fuel particle in accordance with claim 1 wherein said isotropic carbon shell is at least about 20 microns thick.

6. A nuclear fuel particle in accordance with claim 5 wherein said isotropic carbon has a Bacon Anisotropy Factor between 1.0 and about 1.2.

7. A nuclear fuel particle in accordance with claim 1 wherein an isotropic carbon layer is disposed interiorly of said carbide shell.

8. A nuclear fuel particle in accordance with claim 7 wherein said interior isotropic carbon layer is at least about 15 microns thick and has a density between about 1.7 g./cm.³ and about 1.95 g./cm.³.

* * * * *